United States Patent

[11] 3,573,776

| [72] | Inventors | Donald N. Dick<br>Laurel;<br>Michael J. Superczynski, Annapolis, Md. |
|---|---|---|
| [21] | Appl. No. | 677,797 |
| [22] | Filed | Oct. 24, 1967 |
| [45] | Patented | Apr. 6, 1971 |
| [73] | Assignee | The United States of America as represented by the Secretary of the Navy |

[54] BIAS CUTOFF TRIGGER CIRCUIT
10 Claims, 6 Drawing Figs.

[52] U.S. Cl. .................................................. 340/228,
340/177, 331/66, 331/111, 307/290, 307/310
[51] Int. Cl. ...................................................... G08b 17/00
[50] Field of Search ........................................... 340/227,
228, 233; 331/66, 111, 113; 307/310, 265, 290,
293, 292

[56] References Cited
UNITED STATES PATENTS

| 2,742,634 | 4/1956 | Bergen et al. | 340/233 |
| 2,901,740 | 8/1959 | Cutsogeorge | 340/228X |
| 3,118,601 | 1/1964 | Robb, Jr. | 307/290X |
| 3,150,311 | 9/1964 | Jones et al. | 340/228UX |
| 3,237,156 | 2/1966 | Irvine | 340/233 |
| 3,296,553 | 1/1967 | Reid | 331/66X |
| 3,320,602 | 5/1967 | Andrews | 340/233 |
| 3,452,223 | 6/1969 | Pappas | 307/310X |

OTHER REFERENCES

Millman and Taub, Pulse, Digital and Switching Waveforms, 9/17/65 p. 397, 401, 402

Primary Examiner—John W. Caldwell
Assistant Examiner—Perry Palan
Attorneys—L. A. Miller, Q. E. Hodges, A. Sopp and F. A. Lukasik ABSTRACT: A solid-state high temperature alarm system utilizing an off-on-off oscillator with direct current bias cutoff for use as a temperature monitor in an alarm system.

INVENTORS
DONALD N. DICK
MICHAEL J. SUPERCZYNSKI

BY

ATTORNEYS 3,573,776

BIAS CUTOFF TRIGGER CIRCUIT

The invention described herein may be manufactured and used by or for the Government of the United States of America for governmental purposes without the payment of any royalties thereon or therefor.

BACKGROUND OF THE INVENTION

The present invention relates to a high temperature alarm system and more particularly to an electronic intelligence network that can serve as the basis for a completely solid-state alarm system.

Various high temperature alarm systems are used aboard ships or in structures for continuously monitoring the values of physical quantities in a variety of applications. For example, electric or electronic sensing devices are often used to monitor temperature, pressure, speed or conductivity. High temperature alarm systems may be used aboard ships to detect and warn of an overheated condition in compartment where high temperatures can be critical.

Existing electrically operated systems utilize several temperature sensors in each compartment coupled to a master alarm control panel located in a manned engineering space. When an overheated condition occurs, the alarm panel presents an audible alarm signal to attract attention to the panel and a visual display to indicate the particular compartment that is overheated. With the temperature sensors set below the critical compartment temperature, the alarm system affords some opportunity for remedial action before a casualty actually occurs. These systems generally utilize multiple contact relays as the basic intelligence within the alarm control panel and thermomechanical switches as sensors. The sensors generally used are mercury-in-glass thermostats which function as switches when the mercury column reaches a present level. The visual alarm on the control panel is generally presented by a small mechanical flag.

Prior art devices utilizing electromechanical relays as intelligence circuits and visual indicators, are prone to shock and vibration damage as well as attrition through wear and deterioration of electrical contacts. The sensing elements which must incorporate a switching function are usually thermomechanical elements. These also have similar disadvantages with respect to shock and vibration. Relay operation is particularly bad under vibration when the input signal is slightly less than that required to close the relay. Furthermore, the volume, weight and power requirements for such prior art devices were often excessive. In addition, in order to be certain that the devices were operative, they often had to be periodically checked by trained technicians, again at additional time and expense.

SUMMARY

The present invention eliminates the aforesaid disadvantages while providing additional inherent advantages in triggering applications. The general purpose is to provide an intelligence and control circuit for sensing, detecting, monitoring and controlling physical phenomena which can be detected by the variation of a passive electrical circuit element or its transformed equivalent. The circuit is a two-output-state trigger incorporating a passive impedance input. The two-output-state device is basically an oscillator. It may be in either an oscillatory or a nonoscillatory state, depending upon the relationship of the network parameters. To achieve sensory control of the oscillatory state, one of the passive elements of the network is used as a variable impedance. A variation of the impedance over a specified range will determine when oscillation is possible. At higher or lower values of impedance, the oscillations will stop. The trigger circuit then presents information in the form of a preset impedance range. Within the preset range, oscillations will occur and a safe operating condition is indicated. At higher or lower values of impedance, the oscillations will cease and an alarm-or-over-and-under condition is indicated.

Accordingly, an object of the present invention is to provide a circuit of this type which is not subject to the foregoing difficulties.

Another object is the provision of a monitoring circuit having the maximum of self-supervisory and fail-safe capabilities.

A further object is to provide a solid-state alarm system incorporating the advantages of an off-on-off trigger circuit which is compatible with existing alarm systems.

A still further object is to provide an off-on-off oscillator wherein the state of the circuit is controlled by a passive impedance.

Other objects and advantages of the invention will hereinafter become more fully apparent from the following description of the annexed drawings which illustrate a preferred embodiment, and wherein.

DESCRIPTION OF THE PREFERRED EMBODIMENT

Figure 1:
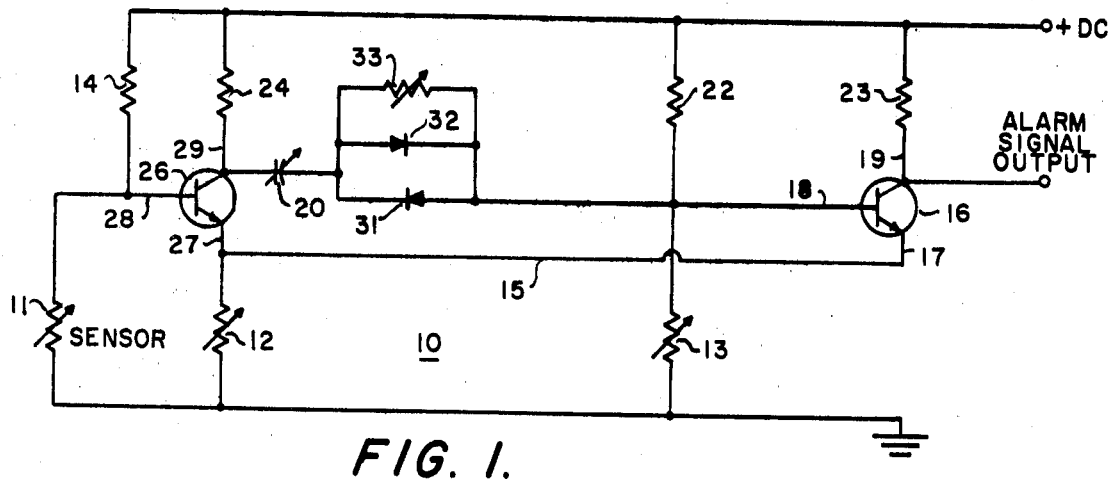
FIG. 1 is a circuit diagram of a complete embodiment of the invention.

Referring now to the drawings wherein like reference characters designate like or corresponding parts throughout the several views, there is shown in FIG. 1 a circuit diagram of the bias cutoff trigger circuit of this invention. The circuit 10, an off-on-off oscillator using direct current bias for cutoff, can generally be classified in the broad area of multivibrators. The circuit 10 presents an oscillating signal at the output for a preset range of resistance of the sensor 11. The sensor 11 may be any element which varies resistance with temperature, for example, a thermistor. A thermistor provides variation of the conductivity voltage threshold in inverse proportion to the temperature change. As the ambient temperature increases, the resistance of the thermistor decreases. The preset range of resistance of sensor 11 is governed by the associated passive components comprising the trigger circuit 10. The oscillations are sustained by positive feedback from the emitter 17 of transistor 16 to the emitter 27 of transistor 26. The control resistance 12, controls the gain of transistor 26, which in turn primarily determines the bandwidth of the sensor 11 resistance region. Bias resistance 13 is used to adjust the base bias of transistor 16 which controls the cutoff points of the oscillator. There is some degree of overlapping of control between control resistance 12 and bias resistance 13 but in combination they provide a simple calibration of the circuit 10 for variations in senor 11.

The frequency of oscillations is controlled by capacitor 20 when resistive values are set. The resistors 22 and 13 are associated with the RC time constant of the oscillator. The two diodes 31 and 32 and resistor 33, connected in parallel, provide hysteresis at the cutoff points of transistors 16 and 26 to prevent erratic cut-on and cutoff at the trigger points. The amount of hysteresis is controlled by adjusting resistor 33 which determines the height of the pulse needed from transistor 26 to turn on and turn off transistor 16. Increasing the resistance of resistor 33, increases the hysteresis effect. Collector 19 of transistor 16 is connected to the positive voltage through resistor 23 and collector 29 of transistor 26 is connected to the positive voltage through resistor 24. Base 18 of transistor 16 is connected to the negative voltage (ground) through variable resistor 13 and emitter 27 of transistor 26 is connected to the negative voltage (ground) through variable resistor 12.

DESCRIPTION OF THE OPERATION

In describing the operation of the oscillator of the circuit 10, several initial conditions must be considered. The base 18 of transistor 16 is biased, bias being controlled by the ratio of resistors 22 and 13 so that transistor 16 is on, that is, normally in the conducting state. Assume that the resistance of sensor 11 is below some cut-on value, $P_2$ in FIG. 2, where transistor 26 is off, that is, not-conducting. Resistor 12 is set at a value such that when the resistance value of sensor 11 is above $P_2$ of FIG. 2, the base-emitter junction of transistor 26 will be forward biased and transistor will then begin to conduct, when transistor 26 conducts, $V_{ce}$ decreases rapidly and the collector 29 voltage drops to a value determined by resistor 12. As this change occurs, a negative going pulse is realized through capacitor 20. This negative going pulse then appears at the base 18 of transistor 16. Transistor 16 begins to turn off and the current delivered by transistor 16 to resistor 12 decreases thus making the base-emitter junction of transistor 26 become even more forward biased and resulting in a further increase in current in the collector circuit of transistor 26. This positive feedback continues until transistor 26 is completely on and transistor 16 is off, thus resulting in a sharp rise in the output signal. However, without an increase or decrease in the collector voltage of transistor 26, the base-emitter junction of transistor 16 becomes forward biased once more and it begins to conduct. This conduction produces a drop in output voltage and an increase in the current delivered to resistor 12 by transistor 16. This reverse biases the base-emitter junction of transistor 26 and transistor 26 returns to its original off state. The above cycle will continue to repeat itself, thus maintaining an oscillator action as long as the loop gain is greater than one and the sensor 11 resistance is within the upper and lower preset limits.

Figure 2:
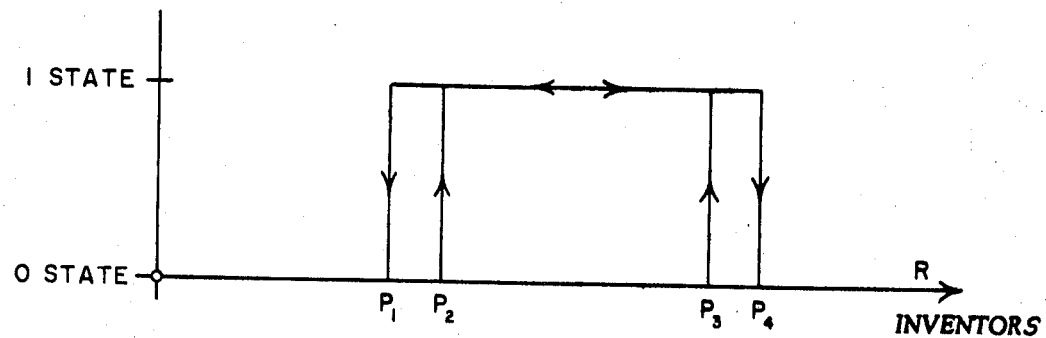
FIG. 2 is a plot of transistor state versus sensor resistance.

As the resistance of sensor 11 approaches $P_4$ of FIG. 2, oscillation of the circuit will cease. This is accomplished when the base-emitter junction of transistor 26 is forward biased to such a degree, determined by the ratio of bias resistor 14 and the resistance of sensor 11, so that even the current supplied to resistor 12 by transistor 16 will not reverse bias this junction. Therefore, transistor 26 remains on, transistor 16 is off, and the output is at a constant high state.

In the preferred embodiment, the cutoff points of the circuit 10 are very sharp. There is no variation in peak amplitude of the signal across the entire oscillating range. The cutoff points are stable within ±4 percent over the temperature range of 5° to 55° C. All fixed resistors are ±5 percent; the diodes are standard stock (unselected); and the circuit will function with any NPN transistor that has a gain over 25. This circuit achieves proper operation with the use of standard stock components.

Figure 4:
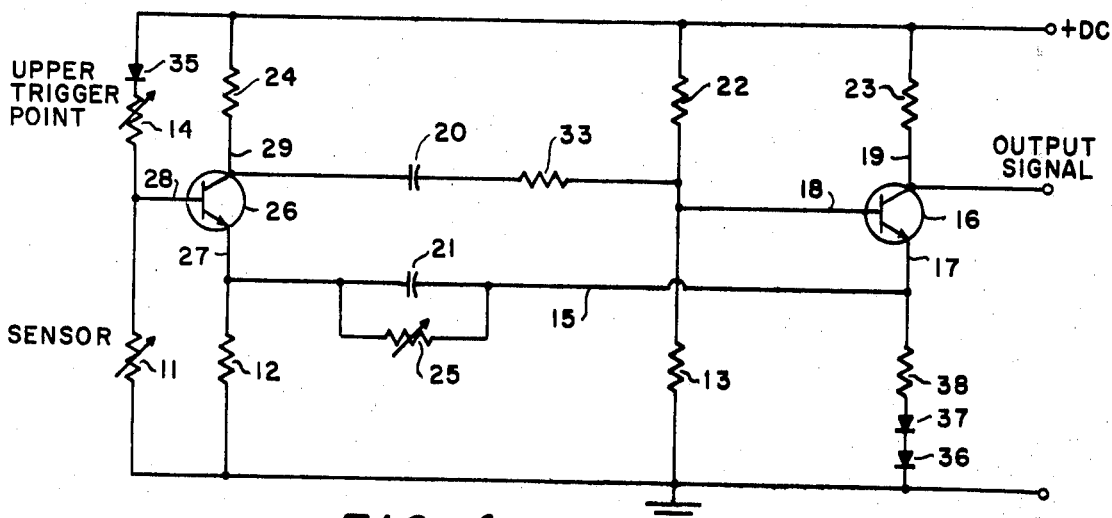
FIG. 4 is a detailed circuit diagram of an alternative embodiment of the invention.

FIG. 4 is a detailed circuit diagram of an alternative embodiment of the invention. The principles of operation are basically similar to the circuit shown in FIG. 1, that is, there is bias cutoff with positive emitter feedback. When the resistance of sensor 11 is within preset limits, as determined by adjustment of the "upper trigger point," resistor 14 in FIG. 4 shown at $P_4$ of FIG. 2, and "bandwidth control" resistor 25, the trigger circuit functions as an oscillator. The oscillations are sustained by positive feedback from the emitter 17 of transistor 16 via lead 15, resistor 25, and capacitor 21 to the emitter 27 of transistor 26. The resistor 25 regulates the amount of direct current feedback to transistor 26 which in turn determines the width of the "safe" region of the resistance of sensor 11. The safe band is increased as resistor 25 is increased. The variable control resistor 14 determines the upper trigger point, the maximum resistance of sensor 11 which will sustain oscillations in the circuit.

If the resistance of sensor 11 is above the preset limit, transistor 26 will saturate continuously and the oscillations will cease. If it is less than the lower preset limit (controlled by resistor 25), transistor 26 will remain in an off condition, transistor 16 will saturate and the oscillations will cease. In either case, there will be no oscillating signal at the output.

Diode 35 is used for additional temperature compensation. Diodes 36 and 37 and resistor 38 are connected in series to form an effective 1.2 volt Zener diode, also used to increase the temperature and amplitude stability.

Figure 5:
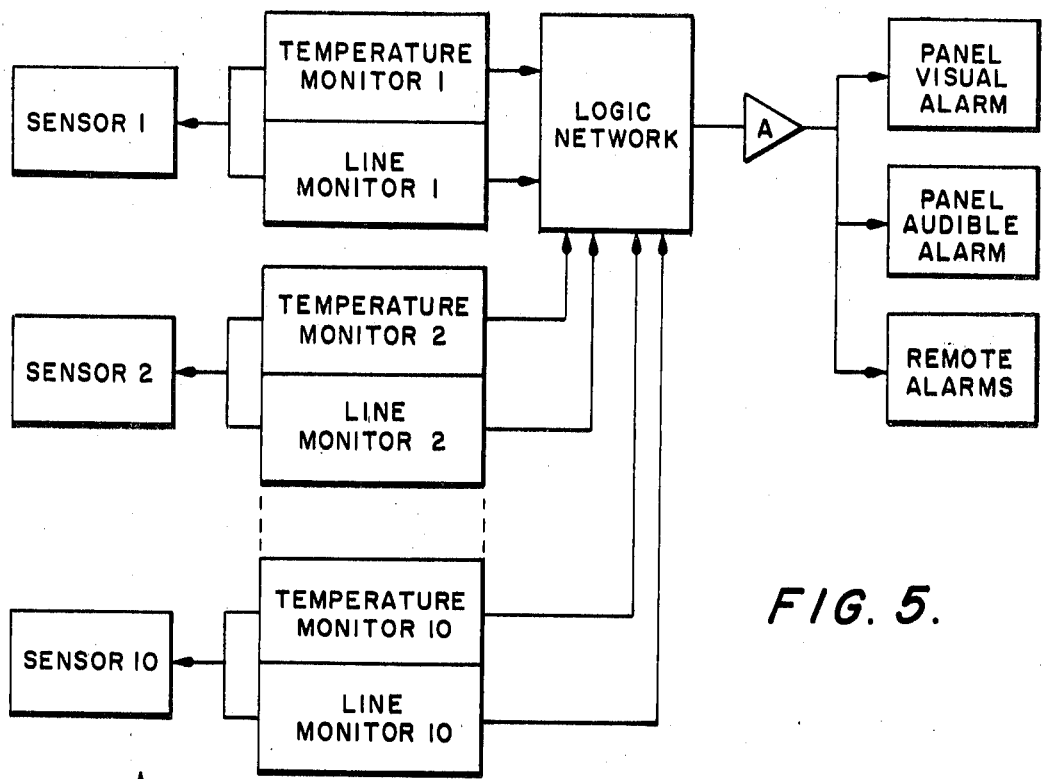
FIG. 5 is a block diagram of a complete alarm system utilizing the invention.

FIG. 5 shows an alarm system incorporating the trigger circuit of the invention as the basic intelligence. The system has been divided into the elements of a sensor, temperature and line monitors, logic network, amplifier, and alarm outputs. The temperature monitor is the basic sensing intelligence and consists of the trigger circuit 10. This unit senses the resistance variation over its entire range and presents information by the existence or absence of oscillations. Over a "safe" resistance range, the oscillations exist; outside this region, the oscillations cease.

Figure 6:
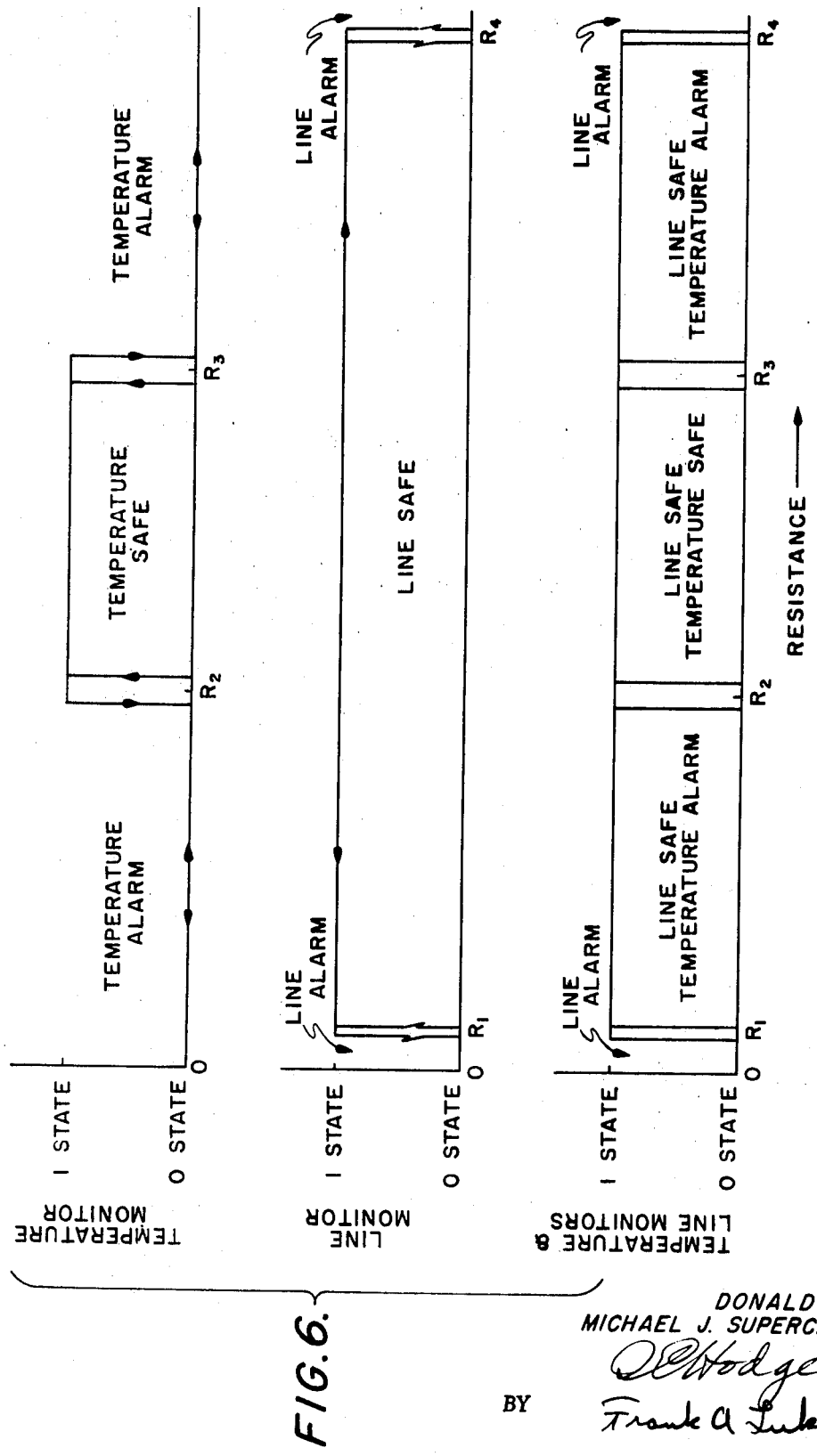
FIG. 6 is a plot of the alarm system logic states.

The line monitor may be another trigger circuit with a larger preset oscillation bandwidth overlapping the bandwidth of the temperature monitor on both ends as shown in FIG. 6. The line unit presents information in the same manner, a continuous signal output when the line is intact and no signal output when the line is shorted or open.

The logic network receives the signals from the temperature and line monitors and presents the necessary signals to the amplifier to be amplified for "safe" and "alarm" indications.

FIG. 6 is a pictorial representation of the logic desired over the entire sensing-resistance range showing the regions for the temperature monitor, the line monitor, and the combined effect of the two. The logic of the monitors is shown as being in either the "one" or the "zero" state; the "one" state representing an existing signal (oscillations), the "zero" state indicating that no signal exists. The hysteresis effect shown at the cut-on and cutoff points of both monitors is intentionally introduced to prevent "chattering" for slowly varying resistances.

In the preferred embodiment, the line monitors shown in FIG. 5 are trigger circuits operating in parallel with the temperature monitors. In an alternative embodiment, direct current switching logic has been used. The logic output is the same, that is, there is a continuous signal out for a line that is intact and a zero output signal for an open or shorted line. The line monitor is connected to the sensor 11 by a bridge circuit (not shown) where the sensor 11 forms one leg of the bridge. In the direct current switching circuit of the alternative embodiment the desired snap action is obtained by employing four inverter stages as switches. The condition of each stage (off or on) in the chain of four, inverts the condition on the next transistor and so forth.

The function of the logic network and amplifier is to receive the signals of the various monitors and present the necessary signals for visual and audible indication. The network presents the status of each individual channel and a general alarm condition for all channels.

As shown in FIG. 6, when both the line and temperature monitors are in the one state, a green light (not shown) is lighted for each channel. This is the condition for safe temperature and a line that is intact. When the temperature monitor is in the zero state, and the line monitor is in the one state, the green light goes out, the channel red light goes on, a general red light goes on and an audible alarm is sounded. This corresponds to an overtemperature alarm. When both monitors are at the zero state, the channel amber light goes on, a general amber light goes on, and an audible alarm is sounded. This would indicate that the line is not intact, either shorted or open.

If for any reason a channel should transiently enter the alarm region and drop back into the safe region, the alarm light would remain lit. When a channel has entered an alarm state, the green light will remain out until the sensor is in the safe region. When this occurs, the green light automatically goes on and the alarm light can be extinguished by pressing a channel clear control. This sets up the logic network to again receive an alarm signal from that channel. If the channel clear control is switched when the sensor is still in the alarm region, the alarm light will remain lit and the general alarm will again be sounded. The network also has the capability of driving remote visual and audible alarms.

Although the sensor 11 has been shown as a resistor, the trigger circuit is compatible with other variable impedance sensors such as: thermistors, conductivity cells, photoresistors and pressure and humidity sensors.

Figure 3:
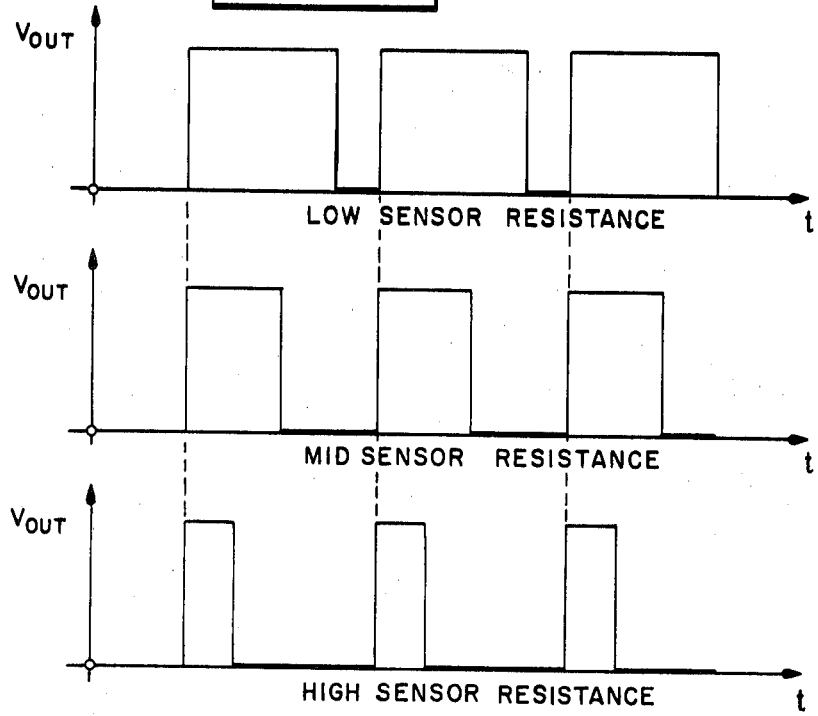
FIG. 3 is a plot of output voltage versus sensor resistance.

From the foregoing description, it will be seen that the present invention provides a condition responsive network incorporating the advantages of an off-on-off trigger circuit which is compatible with existing alarm systems. The circuit has all of the general advantages over other methods plus single element control over frequency of oscillation, over triggering points and over hysteresis. Furthermore the waveform of the circuit varies from "more off-than-on" at one trigger point to "more on-than-off" at the other; with symmetry at approximately the midpoint between trigger points. This feature, shown in FIG. 3, is applicable to a wide range of automatic and adaptive control systems. The trigger circuit uses standard off the shelf items and is completely adaptable to integrated microcircuitry. It operates at a low power and uses no inductors or large value capacitors. Temperature stability of trigger points and bandwidth are within ±4 percent for practical applications. The circuit also has instantaneous cut-on and cutoff at the trigger points.

By way of illustration and example, and not by way of limitation, the following list of components and electrical values therefore is typical for the embodiments of the invention shown in FIGS. 1 and 4 and provide a highly effective trigger circuit for an alarm system.

|  | FIG. 1 | FIG. 4 |
| --- | --- | --- |
| Resistors: | | |
| 11 | 0–30,000 ohms | 0–30,000 ohms. |
| 12 | 0–2,700 ohms | 2,000 ohms. |
| 13 | 0–6,800 ohms | 6,800 ohms. |
| 14 | 50,000 ohms | 0–20,000 ohms. |
| 22 | 50,000 ohms | 15,000 ohms. |
| 23 | 20,000 ohms | 6,800 ohms. |
| 24 | 20,000 ohms | 6,800 ohms. |
| 25 | | 0–50,000 ohms. |
| 33 | 0–68,000 ohms | 6,800 ohms. |
| 38 | | 2,400 ohms. |
| Capacitors: | | |
| 20 | 0–.02 mfd | .033 mfd. |
| 21 | | .068 mfd. |
| Transistors: | | |
| 16 | 2N657 | 2N338. |
| 26 | 2N657 | 2N338. |
| Diodes: | | |
| 31 | 1N3285 | |
| 32 | 1N3285 | |
| 35 | | 1N482. |
| 36 | | 1N482. |
| 37 | | 1N482. |

Obviously many modifications and variations of the present invention are possible in the light of the above teachings. It is therefore to be understood that, within the scope of the appended claims, the invention may be practiced otherwise than as specifically described.

We claim:

1. A condition responsive system for indicating deviations above and below a normal operating zone comprising:

condition responsive means having an electrical output which varies in value in accordance with deviations of said operating zone;

oscillator means having first electron discharge means containing an input terminal and an output terminal and having operating and nonoperating conditions, second electron discharge means containing an input terminal and an output terminal and having operating and nonoperating conditions, and circuit means;

said condition responsive means being connected directly to said first electron discharge means and directly to said circuit means;

said circuit means being electrically connected between said first electron discharge means and said second electron discharge means, whereby said circuit means enables oscillations to be produced at the output terminal of said electron discharge means for a predetermined range of the electrical output of said condition responsive means;

said circuit means furthermore providing control over the frequency of oscillations of said oscillator means, the trigger points present in said oscillator means where said oscillations cut-on and cutoff, the bandwidth of the condition responsive means for which oscillations occur in said oscillator means, and the amount of hysteresis present at said trigger points of oscillation cut-on and cutoff; and a source of potential having positive and negative terminals, said positive terminal connected to said circuit means and said negative terminal connected to both said condition responsive means and said circuit means.

2. A condition responsive system as recited in claim 1 wherein said circuit means includes:

first subcircuit means connecting the output of said second electron discharge means in an energizing relationship to the input of said first electron discharge means and containing a variable resistance means connected between the negative terminal of said potential and in an energizing relationship with the input of said first electron discharge means; and said first subcircuit means providing positive feedback between said first and second electron discharge means, thereby causing said system to oscillate when said condition responsive means detects conditions within said normal operating zone bandwidth by said variable resistance means.

3. A condition responsive system as recited in claim 2 wherein said first and second electron discharge means being first and second transistor means respectively, and said positive feedback being between the emitter of said first transistor means and the emitter of said second transistor means.

4. A condition responsive system as recited in claim 1 wherein said circuit means includes:

second subcircuit means connecting the output of said first electron discharge means to the input of said second electron discharge means; and said second subcircuit means comprising a variable capacitor in series with two parallel diodes and a shunting variable resistance means, said parallel diodes providing hysteresis, thereby preventing erratic oscillation cut-on and cutoff at said trigger points, said variable resistance means controlling the amount of hysteresis present at said trigger points and said variable capacitor controlling the frequency of oscillations.

5. A condition responsive system as recited in claim 1 wherein said circuit means includes; third subcircuit means comprising first resistance means connected between the positive terminal of said potential and the output of said first electron discharge means and second resistance means connected between the positive terminal of said potential and the input of said first electron discharge means, whereby said third subcircuit means provides biasing for said first electron discharge means.

6. A condition responsive system as recited in claim 1 wherein said circuit means includes:

fourth subcircuit means comprising first resistance means connected between the positive terminal of said potential and the output of said second electron discharge means, second resistance means connected between the positive terminal of said potential and the input of said second electron discharge means, and variable third resistance means connected between the negative terminal of said potential and the input of said second electron discharge means, whereby said fourth subcircuit provides biasing from said second electron discharge means; and said variable third resistance means controlling the trigger points present in said oscillator means.

7. A condition responsive system as recited in claim 1 wherein said second electron discharge means produces an oscillating output, said output having a waveform which varies from a more nonoperating-than-operating condition at one of said trigger points to a more operating-than-nonoperating condition at the other of said trigger points and has symmetry at approximately the midpoint between said trigger points.

8. A condition responsive system as recited in claim 2 wherein said circuit means further includes:

second subcircuit means connecting the output of said first electron discharge means to the input of said second electron discharge means; and said second subcircuit means comprising a variable capacitor in series with two parallel diodes and a shunting variable resistance means, said parallel diodes providing hysteresis, thereby preventing erratic oscillation cut-on and cutoff at said trigger points, said variable resistance means controlling the amount of hysteresis present at said trigger points and said variable capacitor controlling the frequency of oscillations.

9. A condition responsive system as recited in claim 8 wherein said circuit means further includes; third subcircuit means comprising first resistance means connected between the positive terminal of said potential and the output of said first electron discharge means and second resistance means connected between the positive terminal of said potential and the input of said first electron discharge means, whereby said third subcircuit means provides biasing for said first electron discharge means.

10. A condition responsive system as recited in claim 9 wherein said circuit means further includes:

fourth subcircuit means comprising first resistance means connected between the positive terminal of said potential and the output of said second electron discharge means, second resistance means connected between the positive terminal of said potential and the input of said second electron discharge means, and variable third resistance means connected between the negative terminal of said potential and the input of said second electron discharge means whereby said fourth subcircuit provides biasing from said second electron discharge means; and said variable third resistance means controlling the trigger points present in said oscillator means.